United States Patent
Park et al.

(10) Patent No.: US 12,456,542 B2
(45) Date of Patent: Oct. 28, 2025

(54) MATERIAL REPRESENTATION IN COMPUTATIONAL SYSTEMS

(71) Applicant: International Business Machines Corporation, Armonk, NY (US)

(72) Inventors: Nathaniel H. Park, San Jose, CA (US); Dmitry Zubarev, San Jose, CA (US); Gowri Nayar, San Jose, CA (US); James L. Hedrick, Pleasanton, CA (US)

(73) Assignee: International Business Machines Corporation, Armonk, NY (US)

( * ) Notice: Subject to any disclaimer, the term of this patent is extended or adjusted under 35 U.S.C. 154(b) by 494 days.

(21) Appl. No.: 17/200,666

(22) Filed: Mar. 12, 2021

(65) Prior Publication Data
US 2022/0293216 A1 Sep. 15, 2022

(51) Int. Cl.
*G16B 25/20* (2019.01)
*G06F 16/903* (2019.01)
*G06F 16/9035* (2019.01)
*G06N 3/08* (2023.01)
*G16B 20/20* (2019.01)

(52) U.S. Cl.
CPC ....... *G16B 25/20* (2019.02); *G06F 16/90335* (2019.01); *G06F 16/9035* (2019.01); *G06N 3/08* (2013.01); *G16B 20/20* (2019.02)

(58) Field of Classification Search
USPC .......................................................... 702/19
See application file for complete search history.

(56) References Cited

U.S. PATENT DOCUMENTS

| | | | |
|---|---|---|---|
| 10,229,519 B2 | 3/2019 | Kaye | |
| 2015/0051889 A1* | 2/2015 | Ohrn | G16B 15/00 703/2 |

OTHER PUBLICATIONS

Sha, Wuxin, et al. "Machine learning in polymer informatics." InfoMat 3.4 (2021): 353-361. (Year: 2021).*
Kim, Chiho, et al. "Active-learning and materials design: the example of high glass transition temperature polymers." MRS Communications 9.3 (2019): 860-866. (Year: 2019).*
Luccarelli, James, and Robert S. Paton. "Hydrogen-Bond-Dependent Conformational Switching: A Computational Challenge from Experimental Thermochemistry." The Journal of organic chemistry 84.2 (2018): 613-621. (Year: 2018).*
Basak, Sayan, and Abhijit Bandyopadhyay. "Toward Making Polymer Chemistry Autonomous." ACS Applied Engineering Materials 2.5 (2024): 1190-1208.*
Barner-Kowollik, Christopher, Jean-Francois Lutz, and Sebastien Perrier. "New methods of polymer synthesis." Polymer Chemistry 3.7 (2012): 1677-1679.*

David et al., Molecular representations in AI-driven drug discovery: a review and practical guide, Journal of Cheminformatics 12(56):1-22 (2020) (available at https://doi.org/10.1186/s13321-020-00460-5).
Drefahl, CurlySMILES: a chemical language to customize and annotate encodings of molecular and anodevice structures, Journal of Cheminformatics 3(1):1-7 (2011) (https://doi.org/10.1186/1758-2946-3-1).
Kobayashi et al., Multiscale Modeling of Polymer Composites: From Atomistic Simulation to Structural Analysis, Paper presented at ABAQUS Users' Conference (May 2002) (available at https://www.3ds.com/fileadmin/PRODUCTS-SERVICES/SIMULIA/Resources-center/PDF/2018-SAoE-Multiscale_Modeling_of_Polymer_Composites_From_Atomistic_Simulation_to_Structural_Analysis.pdf).
Kryven et al., Random Graph Approach to Multifunctional Molecular Networks, Macromolecular Theory Simulations 25:449-465 (2016) (available at https://doi.org/10.1002/mats.201600052).
Lang et al., BpForms and BcForms: a toolkit for concretely describing non-canonical polymers and complexes to facilitate global biochemical networks, Genome Biology 21(117):1-21 (2020) (available at https://doi.org/10.1186/s13059-020-02025-z).
Li & Saude, Explain Graph Neural Networks to Understand Weighted Graph Features in Node Classification, in Machine Learning and Knowledge Extraction, Holzinger et al. (eds), pp. 57-76, CD-MAKE 2020 (available at arXiv:2002.00514v1).
Lin et al., BigSMILES: A Structurally-Based Line Notation for Describing Macromolecules, ACS Central Science 5:1523-1531 (2019) (available at https://doi.org/10.1021/acscentsci.9b00476).
Sanchez-Gonzales et al., Learning to Simulate Complex Physics with Graph Networks, Proceedings of Machine Learning Research (PMLR) 119:8459-8468 (2020) (available at http://proceedings.mlr.press/v119/sanchez-gonzalez20a.html).
Schambock, Random graph modeling of polymer networks, University of Amsterdam UvA-DARE (Digital Academic Repository) (2020) (available at https://dare.uva.nl/search?identifier=99264be2-31ec-4445-b63a-a06714b4d757).
Schamboeck et al., Coloured random graphs explain the structure and dynamics of cross-linked polymer networks, Nature Scientific Reports 10:14627, pp. 1-18 (2020) (available at https://doi.org/10.1038/s41598-020-71417-9).
Schamboeck et al., Dynamic Networks that Drive the Process of Irreversible Step-Growth Polymerization, Nature Scientific Reports 9:2276, pp. 1-18 (2019) (available at https://doi.org/10.1038/s41598-018-37942-4).
Sha et al., Machine learning in polymer informatics, InfoMat, pp. 1-9, John Wiley & Sons Australia, 2021 (available at https://doi.org/10.1002/inf2.12167).

(Continued)

*Primary Examiner* — G. Steven Vanni
(74) *Attorney, Agent, or Firm* — Yee & Associates, P.C.

(57) ABSTRACT

A computational system, which may be an artificial intelligence (AI) system, allows for the electronic representation, modeling, generation, rendering, simulating, and querying of polymeric materials by encoding architectural features as nodes and embedding a directed graph of the polymeric materials within a database system. The embedding of chemical data from multiple nodes within the directed graph data structure enables a scalable data model for containing materials data within computational systems. The computational system may be used for predictive modeling of new polymeric materials and for rendering and/or simulating stochastic polymeric ensembles.

20 Claims, 7 Drawing Sheets

(56) References Cited

OTHER PUBLICATIONS

Webb et al., A Graph-based Approach to Systematic Molecular Coarse-graining, Journal of Chemical Theory Computation 15(2):1199-1208 (2019) (available at https://doi.org/10.1021/acs.jctc.8b00920).
Zhao et al., NanoMine schema: An extensible data representation for polymer nanocomposites, APL Materials 6:111108, pp. 1-17 (2018) (available at https://doi.org/10.1063/1.5046839).

\* cited by examiner

FIG. 1

AB Polymer

MATERIAL REPRESENTATION IN COMPUTATIONAL SYSTEMS

TECHNICAL FIELD

The present invention relates generally to computational modeling of chemical structures and more specifically, to computational methods and systems for converting chemical queries into directed graphs and the use of the directed graphs to model complex chemical structures.

BACKGROUND OF THE INVENTION

The electronic representation of chemical structures within computational systems is critical for the development of artificial intelligence (AI), chemical, and material informatics, and chemical data provenance/interoperability. Electronic representation of small-molecule structures is currently achieved through various forms of line notations, which represent chemical structures as a linear string of characters. Line notations are widely used in cheminformatics because computers can easily process linear strings of data. Examples of line notations include, Wiswesser Line-Formula Notation (WLN), Sybyl Line Notation (SLN), Representation of Structure Diagram Arranged Linearly (ROSDAL), Simplified Molecular-Input Line-Entry System (SMILES), SMILES Arbitrary Target Specification (SMARTS), SMIRKS (an extension of SMILES for generic reactions), and the IUPAC Chemical Identifier (InChI). Line notations do not scale and do not accurately describe polymeric/stochastic materials, composites, or complexes. An alternative to line notations is a knowledge graph schema that embeds all materials data component parts into a single knowledge graph. The single graph approach does not provide a mechanism to determine how individual polymer features and components are reflected within the single knowledge graph, thus leading to data mining redundancy and repetition.

SUMMARY OF THE INVENTION

In one embodiment, the present invention relates to a computer-implemented method for predictive modeling of a new polymeric material comprising: generating graphs encoding data on at least one polymer compound, wherein the graphs comprise (i) nodes encoding architectural features of the at least one polymer compound, (ii) edges encoding chemical bonds between the nodes and the direction of the chemical bonds, and (iii) edge weights encoding information on characteristics of the chemical bonds between the nodes; generating a predictive model comprising data identifying connections between the graphs, wherein directionality and connectivity of the chemical bonds of the at least one polymer compound encodes atomistic, architectural, and topological information that enables data modeling of polymeric materials; and applying the predictive model to develop a polymeric material with user-defined parameters.

In another embodiment, the present invention relates to a computer-implemented method for rendering a new polymeric material comprising: generating at least one graph of a polymeric material and storing the at least one graph in a database, wherein the at least one graph comprises (i) nodes representing architectural features of atomistic structures of the polymeric material, (ii) edges representing chemical bonds between the nodes and the direction of the chemical bonds, and (iii) edge weights representing characteristics of the chemical bonds between the nodes; receiving the at least one graph of the polymeric material from the database; generating at least one model from the at least one graph of the polymeric material and translating the at least one model into artificial intelligence (AI) inputs; and ingesting the AI inputs into an AI system, wherein the AI system accepts queries directed to user-defined polymeric materials and generates AI outputs comprising renderings of a new polymeric material.

In a further embodiment, the present invention relates to a computer-implemented method for translating polymeric materials into artificial intelligence (AI) inputs and outputs comprising: generating at least one graph of a polymeric material comprising (i) nodes representing architectural features of atomistic structures of the polymeric material, (ii) edges representing chemical bonds between the nodes and the direction of the chemical bonds, and (iii) edge weights representing characteristics of the chemical bonds between the nodes; translating the at least one graph of the polymeric material into AI inputs; ingesting the AI inputs into an AI system that accepts queries directed to user-defined polymeric materials and generates AI outputs in response to the queries; and translating the AI outputs into chemical representations of the user-defined polymeric materials.

Additional aspects and/or embodiments of the invention will be provided, without limitation, in the detailed description of the invention that is set forth below.

DETAILED DESCRIPTION OF THE INVENTION

Set forth below is a description of what are currently believed to be preferred aspects and/or embodiments of the claimed invention. Any alternates or modifications in function, purpose, or structure are intended to be covered by the appended claims. As used in this specification and the appended claims, the singular forms "a," "an," and "the" include plural referents unless the context clearly dictates otherwise. The terms "comprise," "comprised," "comprises," and/or "comprising," as used in the specification and appended claims, specify the presence of the expressly recited components, elements, features, and/or steps, but do not preclude the presence or addition of one or more other components, elements, features, and/or steps.

As used herein, the term "block copolymer" refers to a macromolecule containing alternating segments of different polymers linked together through their reactive ends. Each of the blocks of a block copolymer is derived from two of more chemically distinct monomer species.

As used herein, the terms "polymeric material" and "polymeric materials" are used in their broadest sense to refer to any material comprising a polymer, including without limitation, linear polymers, branched polymers, crosslinked polymers, graft polymers, cyclic polymers, dendritic polymers, statistical polymers and copolymers, block copolymers, polymer ensembles, polymer networks, polymer gels, and supramolecular polymeric structures. Examples of supramolecular polymeric structures include, without limitation, micelles, mixed micelles, coacervates, and combination thereof.

As used herein, the term "complex polymeric materials" refers to polymer ensembles, polymer networks, polymer gels, supramolecular polymeric structures, and combinations thereof.

As used herein, the term "polymer compound" refers to a polymeric material that is being used as input for the computational system described herein.

As used herein, the term "parameters" refers to properties, architecture, kinetics, dynamics, atomistic structure, and topology of polymeric materials. Examples of polymeric material properties include, without limitation, degree of polymerization, dispersity, glass transition temperature, melting temperature, heat capacity, intrinsic viscosity, thermal expansion, percent crystallinity, permeability, elastic modulus, bulk modulus, tensile strength, tacticity, and refractive index. Examples of polymeric material architecture include, without limitation, end groups, branching points, repeat units, crosslinks, and blocks. It is to be understood that the architecture of a polymeric material may also describe the architecture of the atomistic structures that comprise the polymeric material. Polymer kinetics refers to the rate of polymer degradation and the rate of monomer polymerization associated with a polymeric material. Polymer dynamics refers to the molecular motion of a polymeric material. Atomistic structure refers to the atom-to-atom interactions within a polymeric material. Topology refers to the spatial features of a polymeric material, which may include, without limitation, linear, branched, and cyclic architectures and polymer networks or ensembles caused by branched crosslinking (e.g., dendrimers) or cyclic crosslinking (e.g., rotaxanes, catenanes).

As used herein, the terms "render" and "rendering" are meant to include renderings of all polymeric material outputs generated by the computational system, including renderings of the structural features of a polymeric material, expanded rendering of a single chain or cross-section of a polymeric material, rendering an ensemble sample of polymeric chains or cross-sections, and multi-scale polymeric simulations and the rendering of their associated outcomes. Examples of multi-scale polymeric simulations include, without limitation, reaction kinetics simulations and bulk property simulations and rendering their associated outcomes.

As used herein, the term "artificial intelligence" or "AI" refers broadly to a computational system that exhibits human intelligence by learning from examples and experience, recognizing objects, understanding and responding to language, making decisions, and solving problems. Within the context of the present invention, all references to artificial intelligence and AI are meant to include, without limitation, machine learning, deep learning, neural networks, deep neural networks, graph neural networks (GNNs), neuro-symbolic models, and human-in-the-loop models.

As used herein, the term "learned polymer representation" refers to GNN-based simulations of polymeric materials.

Described herein is a computational system that allows for the electronic querying and modeling of polymeric materials. Examples of models that may be generated with the computational system include, without limitation, visualizations of polymeric materials, simulations of polymeric materials, identification of new or existing materials related to a polymeric material, generation of predicted reaction conditions to produce a polymeric material, and generation of possible reactions that a polymeric material may undergo. The computational system comprises an interface, a database, and several modeling modules.

Figure 1:
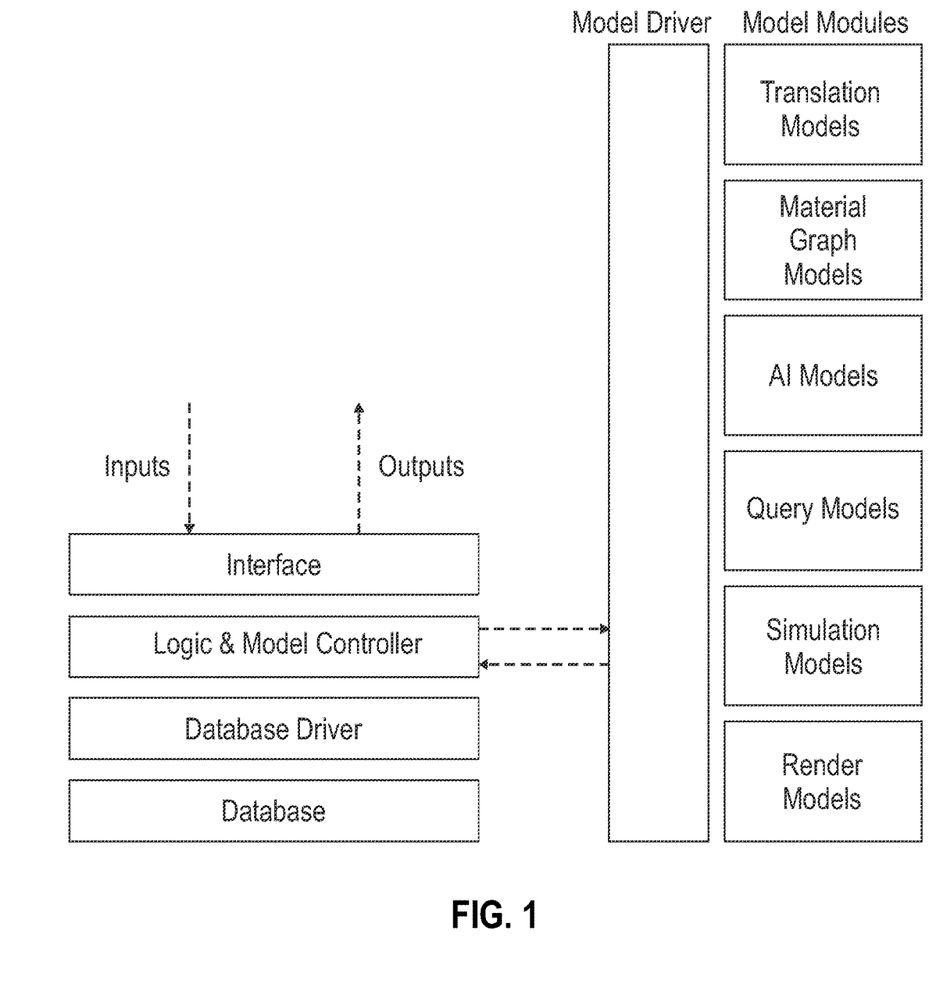
FIG. 1 is a block diagram of a computational system as described herein.

With reference to FIG. 1, the computational system comprises an interface, which accepts inputs and provides outputs. The interface may comprise a graphical user interface that accepts user-defined queries, an application programming interface (API), or a combination of a graphical user interface and an API. Entry of user-defined or AI-defined queries into the interface relate to the architectural, topological, and/or chemical-based features of complex chemical structures. The interface does not use keyword queries or queries directed to the structure of a polymer's original monomer, or a polymer's repeat unit. Once a query is entered into the interface, the logic and model controller transfers the query to the model driver, which directs the query to the appropriate model module within the computational system. Exemplary modeling modules for the computational system include: (i) a material graph model module, which converts the user and AI-defined queries to directed graphs of the materials; (ii) a query model module, which generate models in response to queries; (iii) a renderer model module; (iv) a simulation model module; (v) a translation model module, which converts the directed graphs to computer readable language; and (vi) an AI model module.

The materials graph model module converts the user or AI-defined query into directed graphs of chemical structures comprising nodes and edges. The directed graphs of nodes and edges provide atomistic, architectural and topological information on a polymeric material with: (i) nodes representing architectural features of the polymeric material; (ii) edges representing chemical bonds between the nodes and the direction of the chemical bonds; and (iii) edge weights representing characteristics of the chemical bonds between the nodes. Examples of chemical bond characteristics encoded by edge weights include, without limitation, quantity of the chemical bonds, strength of the chemical bonds, type of the chemical bonds, and combinations thereof.

In one embodiment, the structural features of the nodes are selected from the group consisting of end groups, branching points, repeat units, crosslinks, blocks, and combinations thereof. In a further embodiment, the direction of the chemical bonds of the edges is from point of origin to termination and the edges comprise an electron donor, a nucleophile, and/or an anionic species. In another embodiment, the direction of the chemical bonds of the edges is from point of origin to termination and the edges comprise an electron acceptor, an electrophile, and/or a cationic species. In a further embodiment, the direction of the chemical bonds of the edges is from termination to point of origin and the edges comprise an electron acceptor, an electrophile, and/or a cationic species. In another embodiment, the direction of the chemical bonds of the edges is from termination to point of origin and the edges comprise an electron donor, a nucleophile, and/or an anionic species. In a further embodiment, chemical bonds between the point of origin and the termination point of the edges are selected from the group consisting of covalent bonds, ionic bonds, hydrogen bonds, halogen bonds, non-covalent interactions, and combinations thereof.

Figure 2A:
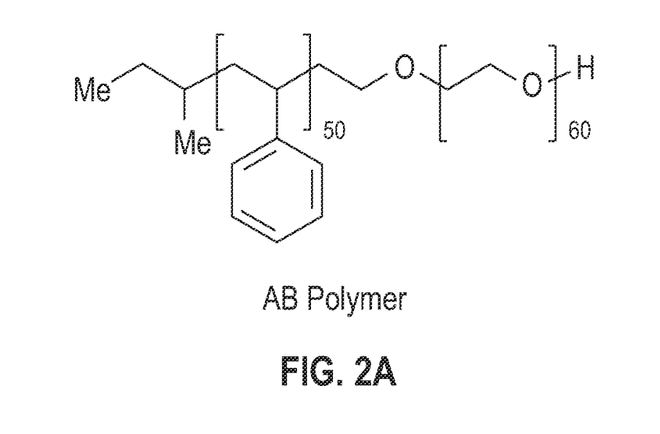
FIG. 2A is a diagram of a block copolymer, AB.
Figure 2B:
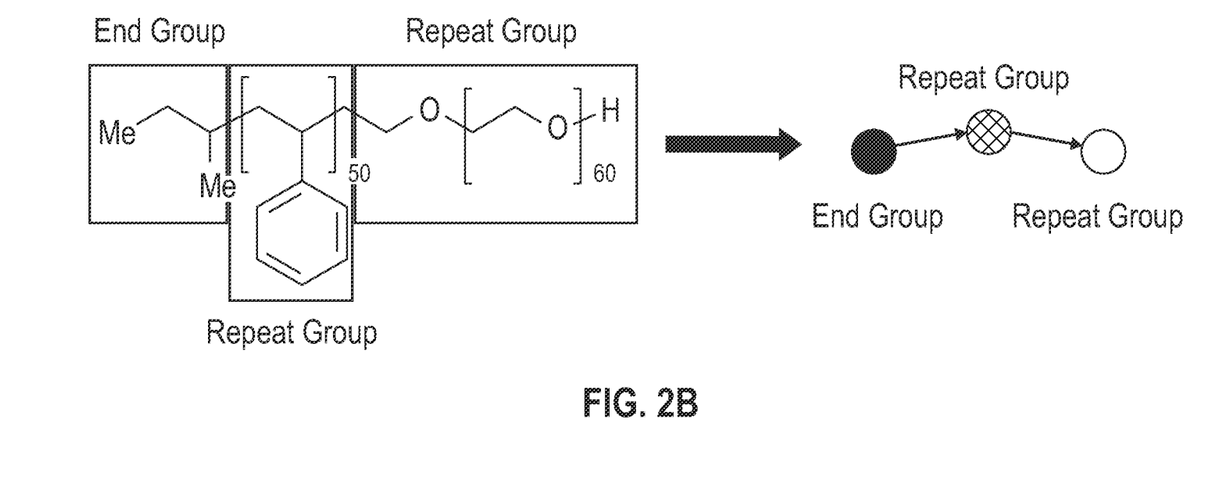
FIG. 2B is a schematic representation of the formation of a directed graph of the AB block copolymer (right panel) generated from the encoding of nodes and edges derived from the AB block copolymer (left panel).

FIG. 2A shows a block copolymer, AB, with three major architectural features: a sec-butyl end group, a styrene block, and an ethylene glycol block, with the styrene block between the end group and the ethylene glycol block. FIG. 2B shows how the computational system represents the AB block copolymer as a graph, with the nodes for the AB polymer represented as an end group and two repeat groups. The chemical connectivity between each node is represented by an edge, which originates from a nucleophile and points towards an electrophile, such that the direction of the graph connections gives information about the bonding between the nodes. The overall connectivity between the nodes as defined by the edges gives rise to the overall architecture of a polymeric material making it unnecessary to semantically embed relationships between each node within the graph.

The query model module accepts queries from the interface directed to polymeric materials based upon a node identity as well as on specific relationships between nodes and develops models of same. The range of queries accepted by the interface and accessed by the query model module enables a user to search for polymeric materials based on their properties, architecture, atomistic structure, and/or topology of edge connections without relying on vaguely descriptive keywords or monomer or repeat-unit based queries. The efficiency of query results achieved with the computational system is on the order of days to weeks of improvement over traditional keyword, monomer-based, or repeat unit-based queries. In one embodiment, the predictive model accepts a query or queries directed to relationships between the nodes and/or node identities to generate renderings of polymeric materials defined by the query or queries.

All models generated by the material graph model module are stored in the database as graph data structures where the nodes and edges of the directed graph are matched to corresponding data collections within the database. The database comprises data collections including, without limitation, (i) records for each node in a graph with relevant weights, SMILES (Simplified Molecular-Input Line-Entry Systems) and/or other line notation for fragment structures, and connectivity for each node; (ii) precomputed graphs at multiple resolution scales as arrays or tuples for faster queries; (iii) records referencing multiple graphs and specifying connections between graphs to enable accurate data modeling of polymeric materials, including complex polymeric materials; and (iv) data on polymer synthesis, reaction kinetics, reaction parameters and references, and instances of materials graphs as products.

Figure 3:
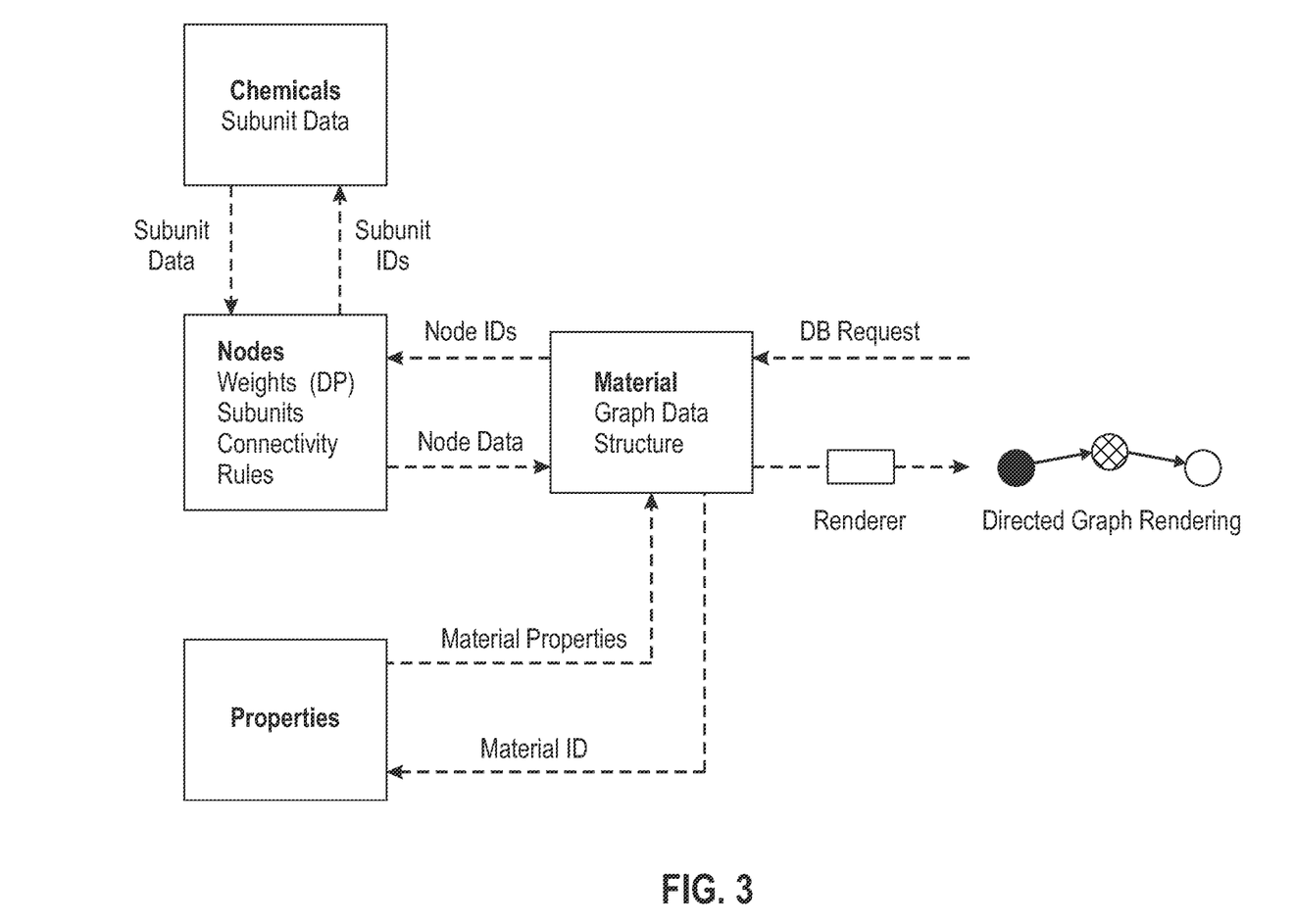
FIG. 3 is schematic representation of the directed graph of FIG. 2B embedded within a computational system as described herein.

FIG. 3 is a representation of the polymer of FIGS. 2A and 2B as a graph data structure embedded within a database of the computational system. In FIG. 3, individual nodes are differentiated from each other by reference to separate data collections that contain information about the components of an individual node, such information including, without limitation, weights (e.g., degree of polymerization, DP), subunits, and connectivity rules. A node may in turn reference a chemical data collection for information on each of the sub-components within that node, such information including, without limitation, chemical structure, molecular weight, and density. Because a node can reference any number of sub-components, chemical data associated with an individual node need only be stored once in order to be available for reference by a different node, the latter of which in turn stores its own chemical data. The embedding of chemical data from multiple nodes (collectively referred to as "material" in FIG. 3) within the graph data structure enables a scalable data model for containing materials data within computational systems. Within the database, the materials data may be further parsed into its properties, which are also stored within the database for reference.

The translation model module of the computational system converts the graphical data generated by the system to computer readable language. The graph data structures generated by the material graph model module or pulled from the database are translated into a computer language, such as line notations, vector representations, or graphical representations. In application, input queries entered into the interface generate graphs via the material graph model module, which are translated to computer language to generate an answer to the query. Prior to output, the answers to the queries are translated back to a graph data structure, which is stored in the database, and further translated via the translation model module to chemical structures, which can be read by the user as output via the interface.

Figure 4:
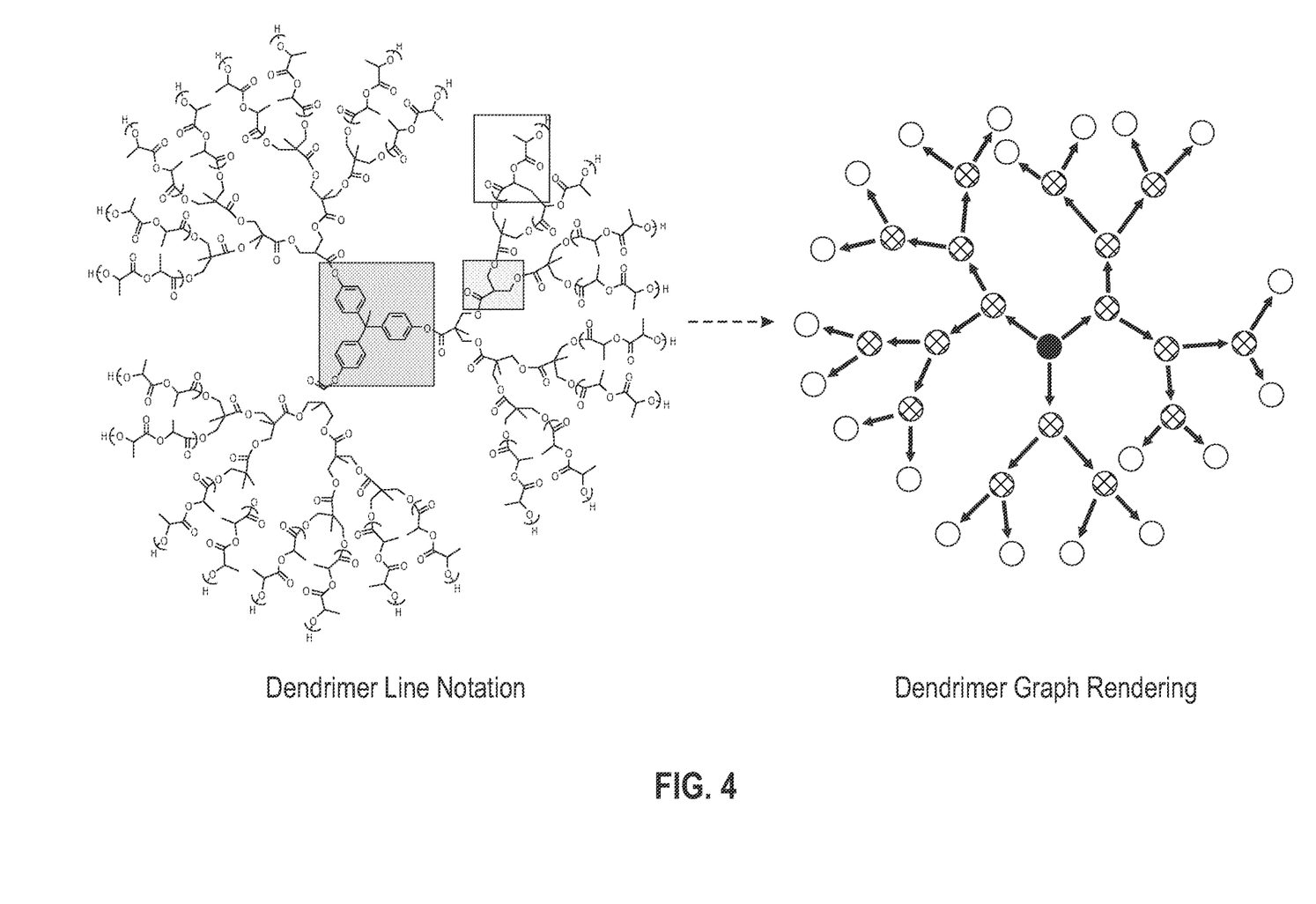
FIG. 4 is an illustration of a line notation dendrimer translated to a directed graph as described herein.

The representation of the polymer as a directed graph whose nodes and edges describe the overall architecture and connectivity of the polymer and the embedding of the directed graph within the database contains comprises all of the information relating to the polymer. In this way, a single query relating to the structure of a polymer can retrieve all of the information from the database that the computational system needs to produce a chemically accurate rendering of the polymer, such information including node, edge, and overall architectural and connectivity information about the components parts of the polymer. FIG. 4 shows how the line notation of a dendrimer is translated by the translation model module into a dendrimer graph rendering, the latter of which is stored in the database. Since the computational system does not embed all of the polymer data within a single knowledge graph, the system does not have issues with data mining redundancy and repetition.

Figure 5:
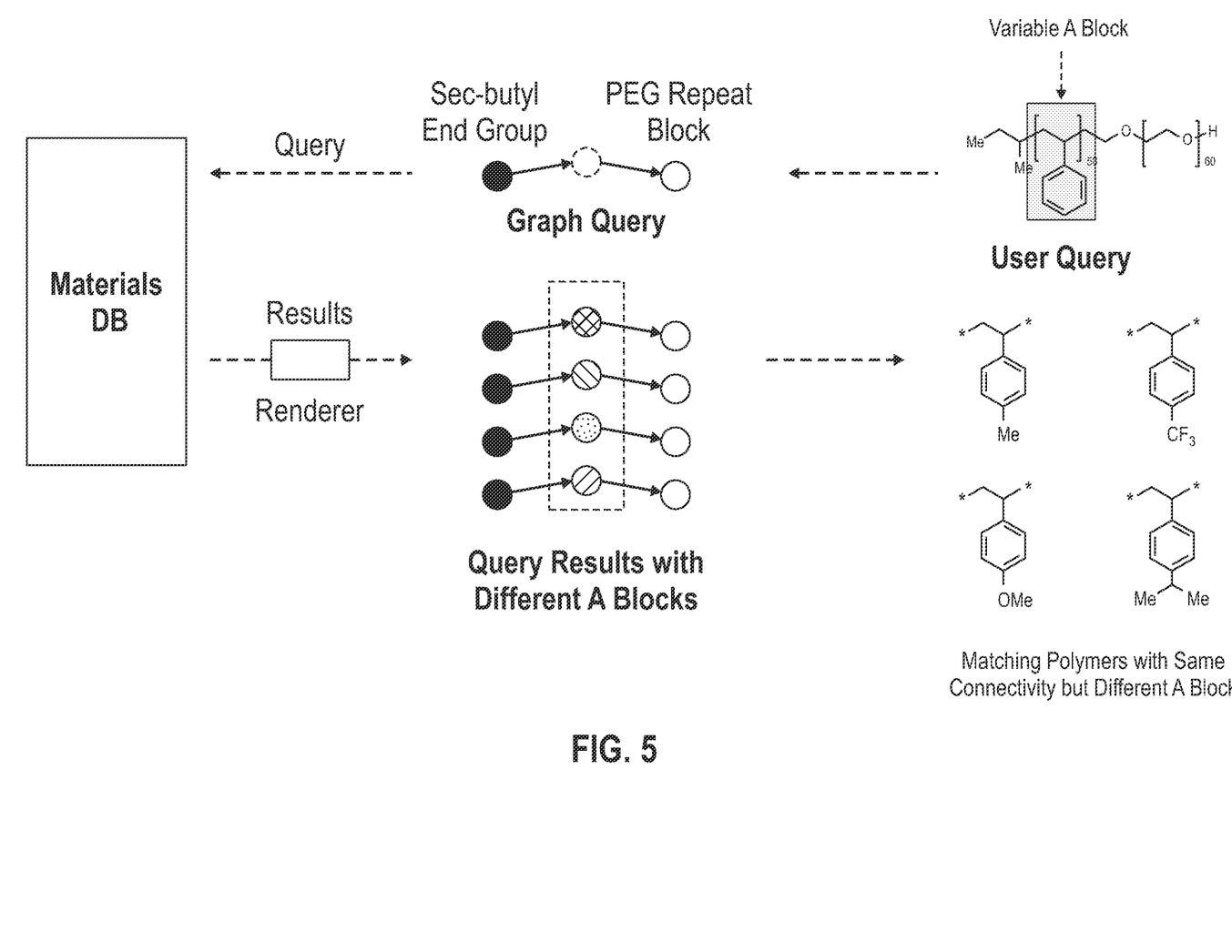
FIG. 5 is a schematic representation of a computational system as described herein that is used for predictive modeling of new polymeric materials derived from the directed graph data structure of FIG. 2B based upon a node search query.

FIG. 5 depicts the steps and results from the following node search query based upon the AB block copolymer graph of FIG. 2B: "Find all AB block copolymers containing a sec-butyl end group, a variable A block, and a polyethylene glycol B block." The result of the node search query is a rendering of multiple AB block copolymers with the same connectivity, but with different A blocks. To arrive at the results of the query, the query entered into the interface is generated into a graph by the material graph model and translated to computer readable language by the translation model module. The query model module ingests the translated information from the translation model module to generate models in response to the query, which are in turn translated by the translation model module back into graph format and provided as output via the interface.

Figure 6:
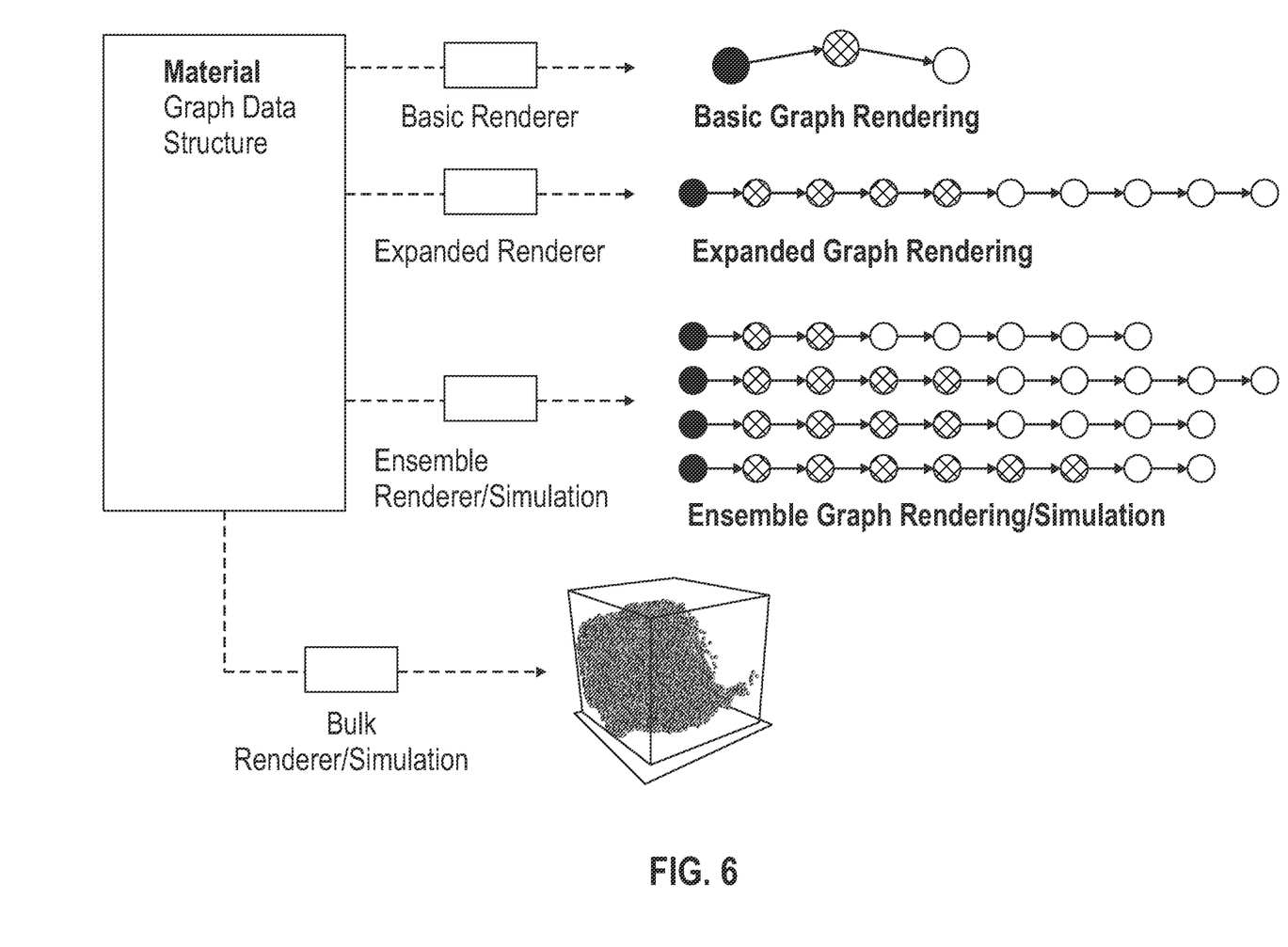
FIG. 6 is a schematic representation of a computational system as described herein that is used for predictive modeling of new polymeric materials and ensembles derived from an expansion of the directed graph data structure of FIG. 2B.

The computational system described herein may be used as a recommender and a simulator by pulling information from the database to generate different rendering and simulation models, including without limitation, predictive models, kinetic models, polymer property models, bulk material models, and combinations thereof. FIG. 6 shows how the basic graph of the AB block polymer of FIG. 2B is expanded via the rendering model module into a single polymer chain originating from the end point with expanded A and B block repeat groups. As each node of a graph data structure contains weights for each of its components, a basic or expanded polymeric rendering can be taken further into a polymeric simulation through the use of deterministic rules based on fundamental polymer chemistry to locate where each node will reference exactly one chemical subcomponent. This additional form of rendering, combined with additional polymer property data (such as for example, polymerization behavior, kinetics or dispersity) can be used to accurately render a simulation of a stochastic ensemble of the polymeric material through the simulation model module. The inclusion of polymerization behavior and kinetics into the rendering and simulation modeling forms the basis for particle-based bulk simulations of materials. The computational system can thus efficiently accommodate different levels of renderings/simulations from a single graph-based representation of polymeric materials. The ability of the computational system to generate expansive and ensemble graph renderings allows for the computational system to be used for predictive modeling by simulating and ultimately generating new polymeric materials.

Figure 7:
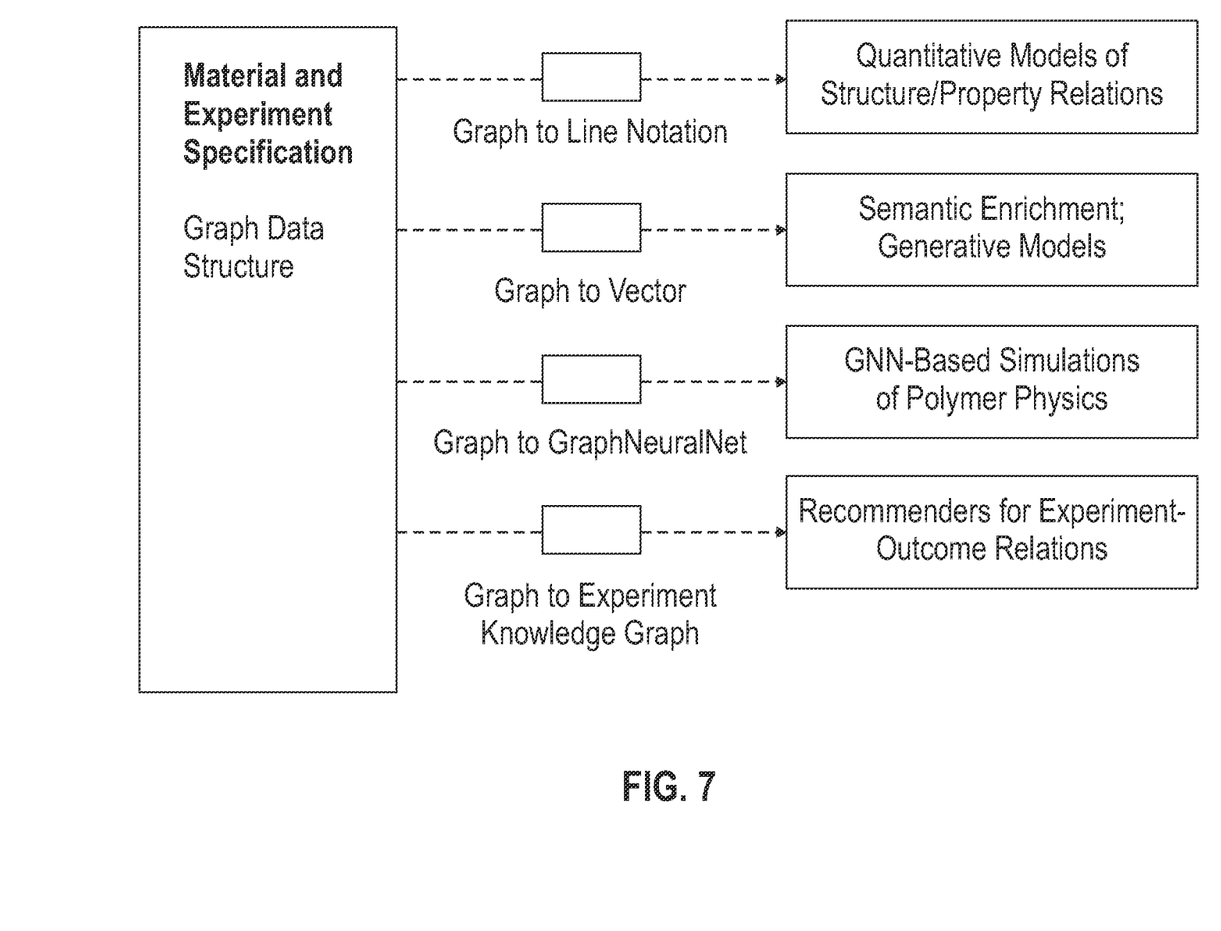
FIG. 7 is a flow diagram of an artificial intelligence (AI) embodiment of the computational system described herein.

All models within the computational system may be generated as AI models through the AI model module. FIG. 7 is a flow diagram showing how the AI model module allows for the computational system to be used as an AI system. Graph data structures generated in the material graph model module and stored in the database are translated via the translation module to appropriate AI inputs, which are ingested into the AI model module. Examples of AI inputs include: (i) line notations, which are used for quantitative models of the structure/property relations of a polymeric material; (ii) vector representations, which are used for semantic enrichment and/or generative models; (iii) graphical representations produced by a Graph Neural Network (GNN), which are used to generate simulations for polymer physics models (models that identify polymer fluctuations, mechanical properties, and kinetics); and (iv) graphical representations in the form of experimental knowledge graphs, which are used for recommender models of experiment outcome relationships. The AI outputs from the AI model module are generally in the same format as the AI inputs. Once generated, the AI outputs are ingested into the material graph data module where they are converted back into graph data structures, which are stored in the database, and translated by the translation model module into chemical representations, which are delivered to the interface as outputs for review by the user.

In one embodiment, the predictive model is a recommender, which may be an AI recommender, that provides recommendations on how to construct the user-defined polymeric material, wherein the recommendations are selected from the group consisting of end groups, branching points, repeat units, crosslinks, blocks, and topology of edge connectivity. As an AI recommender, the computational system via the AI model module is informed on the parameters of existing polymeric materials in order for the computational system to make recommendations on how to achieve a new polymeric material via direct experiment prediction.

In another embodiment, the predictive model is a simulator, which may be an AI simulator, that uses learned polymer representations to compute the properties, architecture, kinetics, dynamics, and topology of the user-defined polymeric materials. As an AI simulator, the computational system via the AI model module is informed on the parameters of a proposed polymeric material in order for the computational system to design a simulation of a new polymeric material. The description of the proposed polymeric parameters may be achieved with GNN-based simulators, which express the molecules comprising the polymer as nodes in a graph and compute the parameters of the proposed polymeric materials via learned polymer representations. In practice, a GNN-based simulator ingests a graph data structure generated from a query and trains itself by identifying appropriate polymer parameters (training sets) from a database that minimize the difference between the graph data structure and the training sets. The learned polymer representations that comprise the GNN-based simulation output identify trends, patterns, and/or clustering associated with the input graph data structure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, a graphics processing unit (GPU), programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various aspects and/or embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the aspects and/or embodiments, the practical application or technical improvement over technologies found in the marketplace, or to enable others of ordinary skill in the art to understand the aspects and/or embodiments disclosed herein.

EXPERIMENTAL

The following examples are set forth to provide those of ordinary skill in the art with a complete disclosure of how to make and use the aspects and embodiments of the invention as set forth herein.

Example 1

Application of the Computational System for AI-Derived Predictive Modeling

The computational system described herein is used for predictive modeling of a new polymeric species or a polymeric species with new properties.

General Procedure: User or AI-defined queries specifying the architectural, topological, and/or chemical features (alone or in combination) of a polymeric material of interest are entered into a graphical user interface of an AI-driven computational system as described herein. The entered queries are converted by the material graph model module of the system into a directed graph comprising nodes and edges. The directed graph is embedded into the materials database as a graph data structure where the nodes and edges of the directed graph is matched with stored data (or metadata) encoded in the database. The graph data structure from the database is translated to an AI input via the translation model module and the AI input is ingested into the AI model platform where the input is used to generate models of polymeric materials that match the user or AI-defined queries. The AI capability of the computational system broadens the returned results by recommending additional materials in parameter spaces adjacent to the initial query. The results of the queries are translated by the translation model module to graph data structures, which are stored in the database, and further translated to chemical structures, which are posted to the graphical user interface for review.

Application: A user enters a query into a graphical user interface of the AI-driven computational system for all AB block polymers with a sec-butyl end group and a polyethylene glycol B block with a degree of polymerization (DP) of 50, but with an A block that can vary in its DP and repeat unit structure. After graph and input processing, the AI model module accesses the architectural, topological, and chemical features specified in the query to return the query results shown in FIG. 5. The AI-capability of the computational system incorporates additional polymer structures with variable A blocks from adjacent materials spaces to the query results. The accumulated results of the query are posted to the graphical user interface as proposed chemical structures where they are viewed by the user.

Example 2

Application of the Computational System for AI-Derived Polymeric Material Rendering and Simulation The computational system described herein is used for the rendering of a polymeric material's structure, architecture, and topology and for simulating the properties of the renderings.

General Procedure: User or AI-defined queries specifying the architectural, topological, and/or chemical features (alone or in combination) of a polymeric material of interest are entered into a graphical user interface of an AI-driven computational system along with additional information relating to the stochastic nature of the polymeric material. The entered queries are converted by the material graph model module into a directed graph comprising nodes and edges. The directed graph is embedded into the materials database as a graph data structure where connectivity, structural, architectural, and topological information encoded in the database is matched to the nodes and edges of the directed graph. The graph data structure from the database is translated into AI input by the translation model module and the AI inputs are ingested into the AI model module. The AI model module applies polymerization kinetic models and associated materials characterization data to generate various renderings of the polymeric material with simulations of the materials properties of the various renderings. The renderings and simulations are translated by the translation model module to graph data structures, which are stored in the database, and further translated to chemical structure renderings and simulations, which are posted to the graphical user interface for review.

Application: A user enters a query for the structure of an AB block copolymer as described herein with the inclusion of additional information regarding the stochastic nature of the polymer, such additional information including degree of polymerization and dispersity. After graph and input processing, the AI-model module expands the base graph rendering (shown in FIG. 1B) to a probabilistic rendering of a single polymer chain with each repeat unit and its connectivity explicitly rendered as a node and edges. The AI modeling is further expanded to provide a simulated rendering of a stochastic ensemble of polymer chains and coarse modeling/simulation of their materials properties, such materials properties including polymer chain growth during polymerization, gelation, and self-assembly. Schematic representations of the expanded polymer chain and the stochastic polymer ensemble are shown in FIG. 6. The AI-driven computational system may be further used to simulate bulk material properties and behavior by building off of earlier simulations and embedded characterization data.

We claim:
1. A method comprising:
computationally generating graphs encoding data on at least one polymer compound, wherein the graphs comprise (i) nodes encoding architectural features of the at least one polymer compound, (ii) edges encoding chemical bonds between the nodes, topology of edge connectivity, and a direction of the chemical bonds, and (iii) edge weights encoding information on characteristics of the chemical bonds between the nodes including degree of polymerization;
computationally generating a predictive model comprising data identifying connections between the graphs, wherein directionality and connectivity of the chemical bonds of the at least one polymer compound encodes atomistic, architectural, and topological information comprising data modeling of user-defined polymeric materials with user-defined parameters based on user-defined queries that include architectural, topological and chemical-based features of a chemical structure, including topology of edge connectivity and degree of polymerization between nodes; and
producing the user-defined polymeric materials,
wherein the architectural features of the nodes include at least three of end groups, branching points, repeat units, crosslinks, and blocks.

2. The method of claim 1, wherein when the direction of the chemical bonds of the edges is from point of origin to termination, the edges are either (i) selected from the group consisting of an electron donor, a nucleophile, and an anionic species or (ii) selected from the group consisting of an electron acceptor, an electrophile, and a cationic species.

3. The method of claim 1, wherein when the direction of the chemical bonds of the edges is from termination to point of origin, the edges are either (i) selected from the group consisting of an electron acceptor, an electrophile, and a cationic species or (ii) selected from the group consisting of an electron donor, a nucleophile, and an anionic species.

4. The method of claim 1, wherein the chemical bonds between a point of origin and a termination point of the edges are selected from the group consisting of covalent bonds, ionic bonds, hydrogen bonds, halogen bonds, non-covalent interactions, and combinations thereof.

5. The method of claim 1, wherein the predictive model accepts a query or queries directed to relationships between an element selected from the group consisting of the nodes and node identities to generate renderings of polymeric materials defined by the query or queries.

6. The method of claim 1, wherein the predictive model is a recommender that provides recommendations on how to achieve the user-defined polymeric materials, wherein the recommendations are selected from the group consisting of end groups, branching points, repeat units, crosslinks, blocks, and topology of edge connectivity.

7. The method of claim 1, wherein the predictive model is an artificial intelligence simulator that uses learned polymer representations to compute properties, architecture, kinetics, dynamics, and topology of the user-defined polymeric materials.

8. A method comprising:
computationally generating at least one graph of a polymeric material and storing the at least one graph in a database, wherein the at least one graph comprises (i) nodes representing architectural features of atomistic structures of the polymeric material, (ii) edges representing chemical bonds between the nodes, topology of edge connectivity, and a direction of the chemical bonds, and (iii) edge weights representing characteristics of the chemical bonds between the nodes including degree of polymerization;

receiving the at least one graph of the polymeric material from the database;

computationally generating at least one model from the at least one graph of the polymeric material and translating the at least one model into artificial intelligence (AI) inputs;

ingesting the AI inputs into an AI computer system, wherein the AI computer system accepts queries directed to user-defined polymeric materials with user-defined parameters based on user-defined queries that include architectural, topological and chemical-based features of a chemical structure, including topology of edge connectivity and degree of polymerization between nodes, and wherein the AI computer system generates AI outputs in response to the queries; and producing the user-defined polymeric materials, wherein the architectural features of the nodes include at least three of end groups, branching points, repeat units, crosslinks, and blocks.

9. The method of claim 8, wherein the polymeric material is selected from the group consisting of block copolymers, linear polymers, polymer ensembles, statistical polymers and copolymers, graft polymers, branching polymers, cyclic polymers, dendritic polymers, polymer networks, polymer gels, supramolecular polymeric structures, and combinations thereof.

10. The method of claim 8, wherein the AI inputs and the AI outputs are selected from the group consisting of line notations, vector representations, graph representations, and combinations thereof.

11. The method of claim 8, wherein the AI computer system accepts queries directed to features selected from the group consisting of atomistic, architectural, and topological features of the user-defined polymeric materials.

12. The method of claim 8, wherein the AI computer system is a recommender that provides recommendations on how to construct the user-defined polymeric materials, wherein the recommendations are selected from group consisting of end groups, branching points, repeat units, crosslinks, blocks, and topology of edge connectivity.

13. The method of claim 8, wherein the AI computer system is a simulator that uses learned polymer representation to compute properties, architecture, kinetics, dynamics, and topology of the user-defined polymeric materials.

14. A method comprising:

computationally generating at least one graph of a polymeric material comprising (i) nodes representing architectural features of atomistic structures of the polymeric material, (ii) edges representing chemical bonds between the nodes, topology of edge connectivity, and a direction of the chemical bonds, and (iii) edge weights representing characteristics of the chemical bonds between the nodes including degree of polymerization;

computationally translating the at least one graph of the polymeric material into AI inputs;

ingesting the AI inputs into a computerized AI system that accepts queries directed to user-defined polymeric materials with user-defined parameters based on user-defined queries that include architectural, topological and chemical-based features of a chemical structure, including topology of edge connectivity and degree of polymerization between nodes, and generates AI outputs in response to the queries;

translating the AI outputs into chemical representations of the user-defined polymeric materials; and producing the user-defined polymeric materials, wherein the architectural features of the nodes include at least three of end groups, branching points, repeat units, crosslinks, and blocks.

15. The method of claim 14, wherein the polymeric material is selected from the group consisting of block copolymers, linear polymers, polymer ensembles, statistical polymers and copolymers, graft polymers, branching polymers, cyclic polymers, dendritic polymers, polymer networks, polymer gels, supramolecular polymeric structures, and combinations thereof.

16. The method of claim 14, wherein the AI inputs and the AI outputs are selected from the group consisting of line notation, vector representation, graph representations, and combinations thereof.

17. The method of claim 14, wherein the AI computer system accepts queries directed to features selected from the group consisting of atomistic, architectural, and topological features of the user-defined polymeric materials.

18. The method of claim 14, wherein the AI computer system is a recommender that provides recommendations on how to construct the user-defined polymeric materials, wherein the recommendations include end groups, branching points, repeat units, crosslinks, blocks, and topology of edge connectivity.

19. The method of claim 14, wherein the AI computer system is a simulator to that uses learned polymer representation to compute properties, architecture, kinetics, dynamics, and topology of the user-defined polymeric materials.

20. The method of claim 14, wherein the AI inputs and the AI outputs are selected from the group consisting of line notation, vector representation, graph representations, and combinations thereof, and wherein the AI computer system accepts queries directed to features selected from the group consisting of atomistic, architectural, and topological features of the user-defined polymeric materials.

* * * * *